United States Patent [19]

Mizuta et al.

[11] Patent Number: 5,086,858

[45] Date of Patent: Feb. 11, 1992

[54] AIR INTAKE SYSTEM FOR UTILITY VEHICLE

[75] Inventors: Fumio Mizuta, Akashi; Takashi Arii, Kakogawa; Yoshiharu Matsuda, Akashi; Itsuo Takegami, Kobe, all of Japan

[73] Assignee: Kawasaki Jukogyo Kabushiki Kaisha, Kobe, Japan

[21] Appl. No.: 621,635

[22] Filed: Dec. 3, 1990

[30] Foreign Application Priority Data

Aug. 17, 1990 [JP] Japan .................. 2-86585[U]

[51] Int. Cl.[5] .................. B60K 13/02; B60K 13/06; B60K 11/06
[52] U.S. Cl. .................. 180/68.3; 180/68.1; 55/385.3; 123/41.56; 123/41.65
[58] Field of Search .................. 180/68.1, 68.2, 68.3, 180/908; 123/41.56, 41.58, 41.62, 41.7, 41.65; 55/385.3

[56] References Cited

U.S. PATENT DOCUMENTS

| | | | |
|---|---|---|---|
| 2,250,795 | 7/1941 | FitzGerald et al. | 180/69.2 X |
| 2,319,002 | 5/1943 | Kramer | 180/68.2 X |
| 4,606,422 | 8/1986 | Jewett | 180/68.3 X |
| 4,932,490 | 6/1990 | Dewey | 180/68.3 |
| 4,971,172 | 11/1990 | Hoffman et al. | 180/68.3 |

FOREIGN PATENT DOCUMENTS

| | | | |
|---|---|---|---|
| 2212016 | 9/1973 | Fed. Rep. of Germany | 180/68.2 |
| 2715760 | 10/1978 | Fed. Rep. of Germany | 180/68.2 |
| 62-163363 | 10/1987 | Japan . | |
| 63-202579 | 12/1988 | Japan . | |
| 0109727 | 4/1990 | Japan | 180/908 |
| 2-83183 | 6/1990 | Japan . | |

Primary Examiner—Andres Kashnikow
Assistant Examiner—Brian L. Johnson
Attorney, Agent, or Firm—Marshall, O'Toole, Gerstein, Murray & Bicknell

[57] ABSTRACT

An air intake system for a utility vehicle powered by an engine (8) located near the driver's seat (6) and which drives one or more wheels (3) of the vehicle via a belt converter (13) comprises a hollow open ended and generally rectangular frame (10) disposed with one of its lower ends (10a) connected to the air intake (Ie) of the engine and the other lower end (10b) connected to the air intake (Ib) port (22) for cooling the belt converter, and an air intake (S) in an upper part of the frame. Such a system results in less dust and dirt being drawn into the air intakes and reduces air pulsing and thereby improves engine performance.

5 Claims, 7 Drawing Sheets

AIR INTAKE SYSTEM FOR UTILITY VEHICLE

This invention relates to an air intake system for the engine of a three- or four-wheeled buggy or similar type of utility vehicle.

Although small trucks or tractors for pulling trailers have been used in the past to carry cargo in agricultural and other applications, many three-wheeled and four-wheeled buggies have recently been developed and proposed for use as small vehicles suitable for being driven over farmland and open country (for example, see Japanese Provisional Utility Model Publications 62-163363 and 63-202579).

Figure 10:
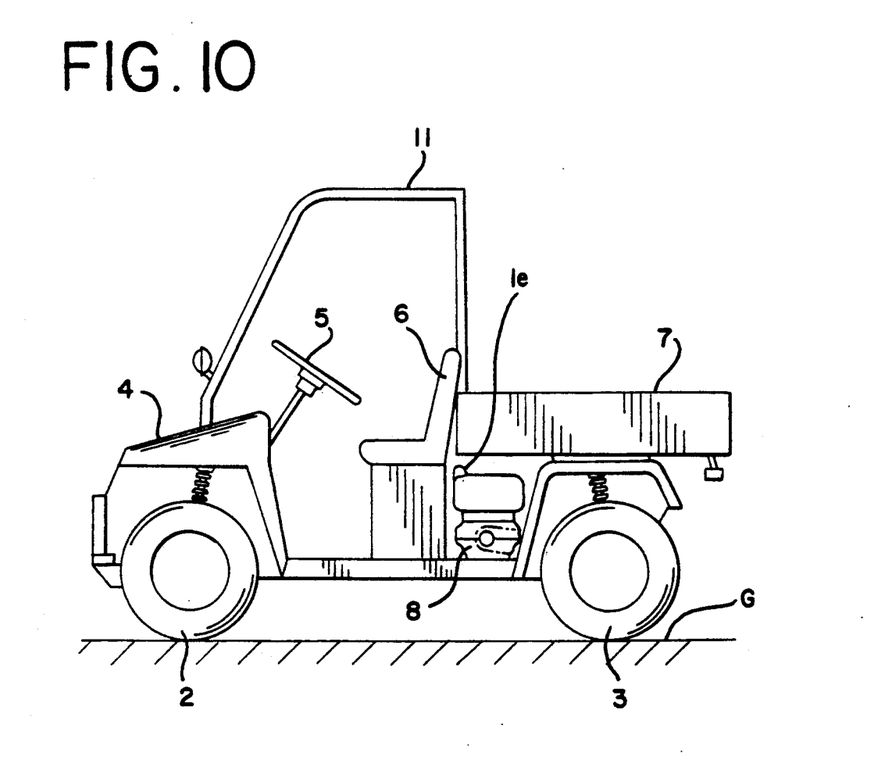

Because this type of utility vehicle must be compact, lightweight and easy to operate, a belt converter is generally used for speed changing. As shown in FIG. 10 of the accompanying drawings, the engine 8 of such a vehicle is commonly located behind the driver's seat 6, and the air intake Ie for the air cleaner of this engine 8 is positioned beneath the cargo bed 7 to the rear of the seat 6. In addition, although it is not shown in the drawing, the duct for taking in air for cooling the belt converter passes beneath the cargo bed 7 and extends underneath the seat, with the air intake port opening underneath the seat 6. In the drawing, 5 is the steering wheel, 4 is the hood, 2 and 3 are the front and rear wheels, respectively and 11 is a crossbar frame which extends from the hood 4 to the cargo bed 7 so that it covers the seat 6.

In the prior art, because the road clearance of the vehicle body is small and the engine air intake and the air intake port for cooling the belt converter are positioned close to the ground G, there is the danger of large amounts of dust, especially that thrown up by the front wheels, being sucked in. As a result, the air cleaner element becomes dirty in a short time, leading to clogging, and not only reducing the performance of the engine, but also requiring that the element be cleaned or replaced frequently, especially when the vehicle is used for long periods of time (for example, 20 hours a day) as a utility vehicle for making the rounds of farm fields, thus increasing both the time and cost required for maintenance. In addition, there is also the danger that the durability and life of the belt and other parts of the belt converter will be reduced by the intake of dust and other foreign matter.

Separate air intake ducts have previously been provided in such vehicles for the engine and for cooling the belt converter, and there was the physical difficulty of locating both of these ducts in such a confined space.

Figure 9:
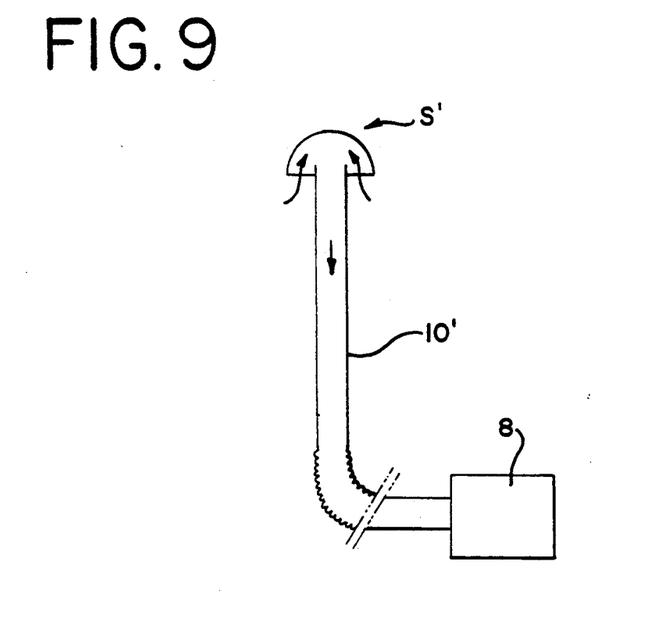
FIGS. 9 and 10 are side views of an air intake and of a four-wheeled buggy according to the prior art.

FIG. 9 of the accompanying drawings illustrate an example of a prior art air intake pipe 10' for the engine 8, installed vertically behind the drivers seat, with a mushroom-shaped air intake port S' provided at the upper end of this pipe. However, since this is only for the engine air intake and because the air intake pipe 10' is long, air intake pulsing (the phenomenon of pressure waves being generated by the opening and closing of the air intake port) occurs, and this affects the amount of air taken in, thus making it difficult to adjust the setting of the carburetor. As a result, the appropriate amount of air is not always supplied to the engine, and in turn the appropriate amount of fuel is not supplied, thus causing a drop in engine performance.

The present invention seeks to provide an air intake system in which the air guidance passages for the engine and for the cooling of the belt converter are formed and interconnected by a single hollow frame. In this way, pulsing of the two airintakes is reduced by their mutual interference, and thus air intake is accomplished smoothly with no adverse effects on engine performance.

According to the invention, there is now provided an air intake system for a utility vehicle powered by an engine located near the driver's seat and which drives one or more wheels of the vehicle via a belt converter, characterized by a hollow open ended and generally rectangular frame disposed vertically behind the seat with one of its lower ends connected to the air intake of the engine and the other lower end connected to the air intake port for cooling the belt converter, and provided with an upper air intake.

In the system of the invention, the air supplied to the engine and to the belt converter is taken in through an air intake provided at a high position at the top of a frame in the shape of an open-ended rectangle. Using the inside of the hollow frame as air guidance passages, that air is guided on one side to the air intake of the engine, and simultaneously on the other side to the air intake port for cooling the belt converter. Thus, even when the utility vehicle is driven over farmland or sandy ground, for example, very little dust or sand is taken in and clogging of the air cleaner is reduced, and it is possible to supply clean air to the engine.

Furthermore, the intake of air for the belt converter and the intake of air for the engine are performed simultaneously, and air intake pulsing is reduced as a result of the mutual interference of the pulsing of the two air intakes, thus ensuring the appropriate amount of air for the engine.

The invention will now be described in greater detail by way of example only with reference to the accompanying drawings, in which.

Figure 1:
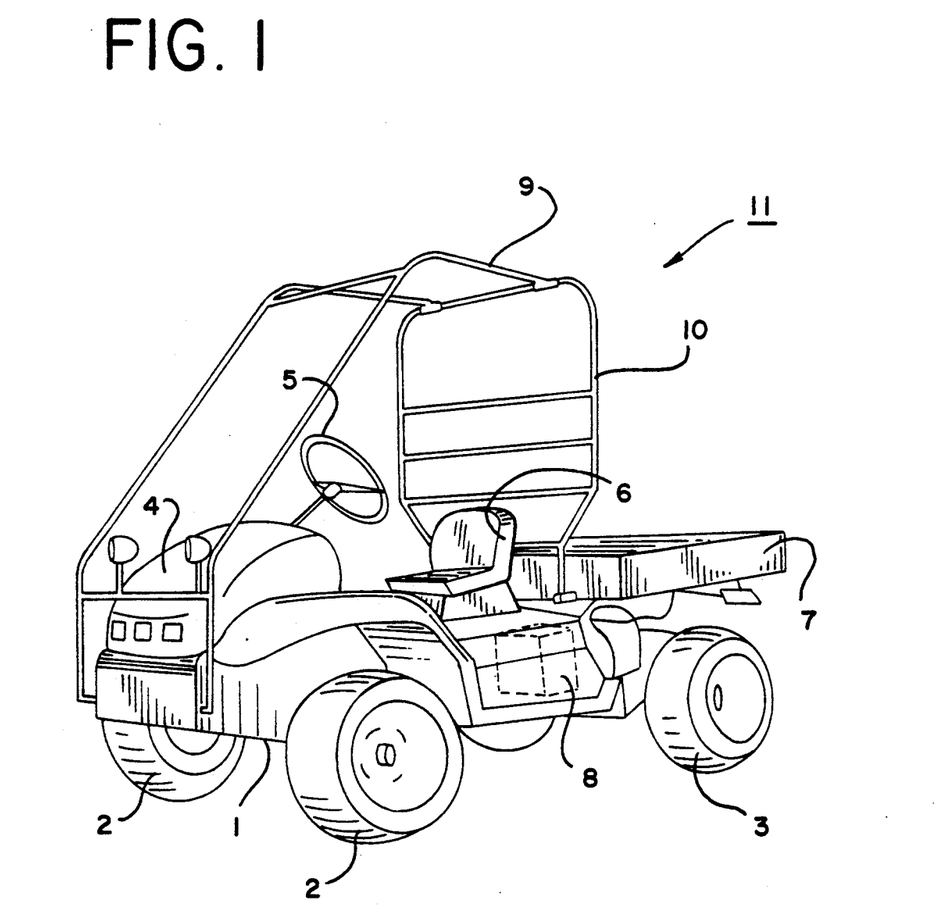
FIG. 1 is a perspective view of a four-wheeled buggy which is one example of the type of vehicle to which this invention is applicable.

Referring to the drawings, FIG. 1 is a perspective view of a four-wheeled buggy which is one example of the type of vehicle to which this invention is applicable. As shown in the drawing, the body 1 of the buggy is provided with front wheels 2 and rear wheels 3 on the left and right sides, a hood 4 is mounted to the front of the body 1, and to the rear of the hood 4 are provided a steering wheel 5 and a driver's seat 6. Also, a cargo bed 7 is provided behind the driver's seat 6. An engine 8 for driving the rear wheels 3 is located to the rear of the driver's seat 6 beneath the cargo bed 7.

Between the hood 4 and the front of the cargo bed 7, there is erected a crossbar member 11 comprising a front frame 9 which extends first horizontally and then downward toward the front and another frame 10 in the shape of an open-ended rectangle as seen from the front, so that it covers the driver's seat 6. By covering this crossbar frame 11 with a top, the buggy becomes an all-weather vehicle.

Figure 2:
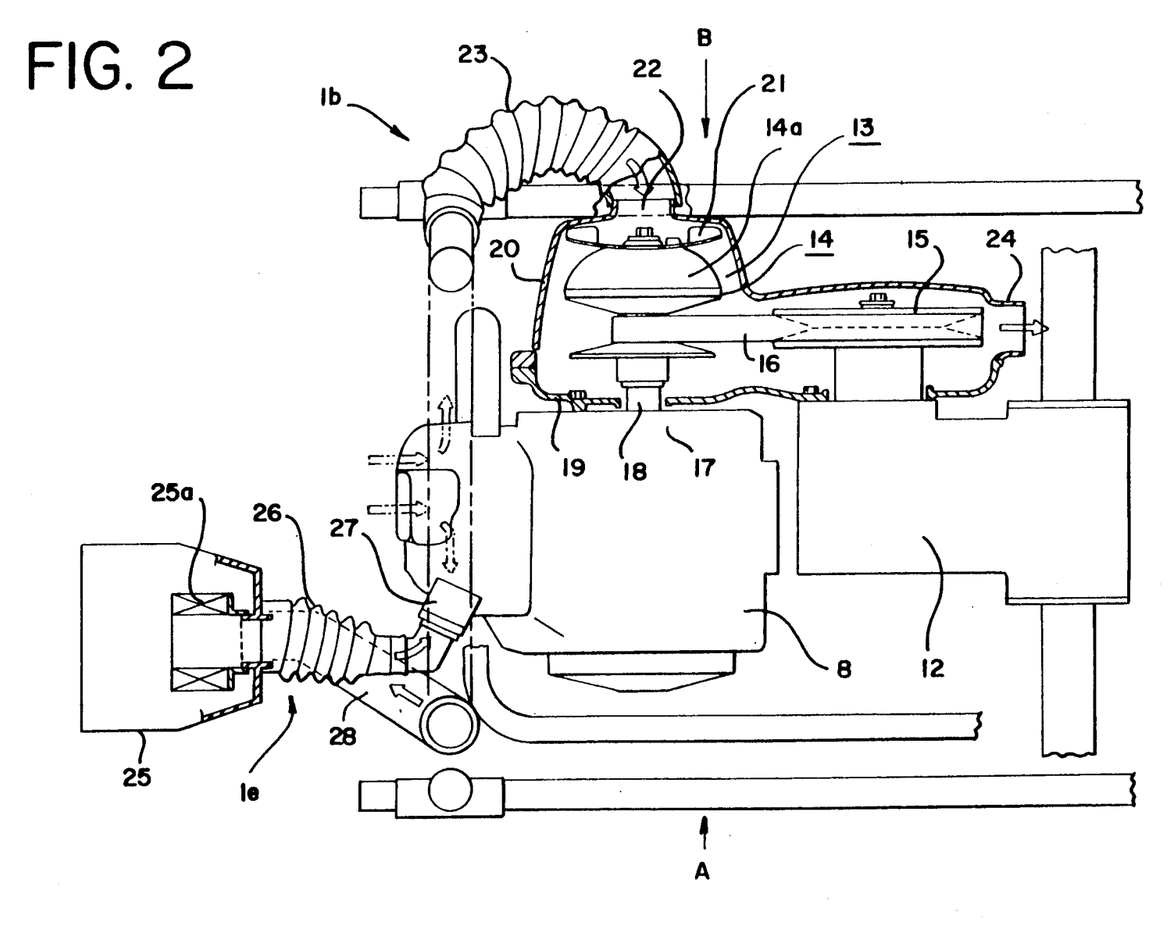
FIG. 2 is a plan view of the engine layout of such a vehicle.
Figure 3:
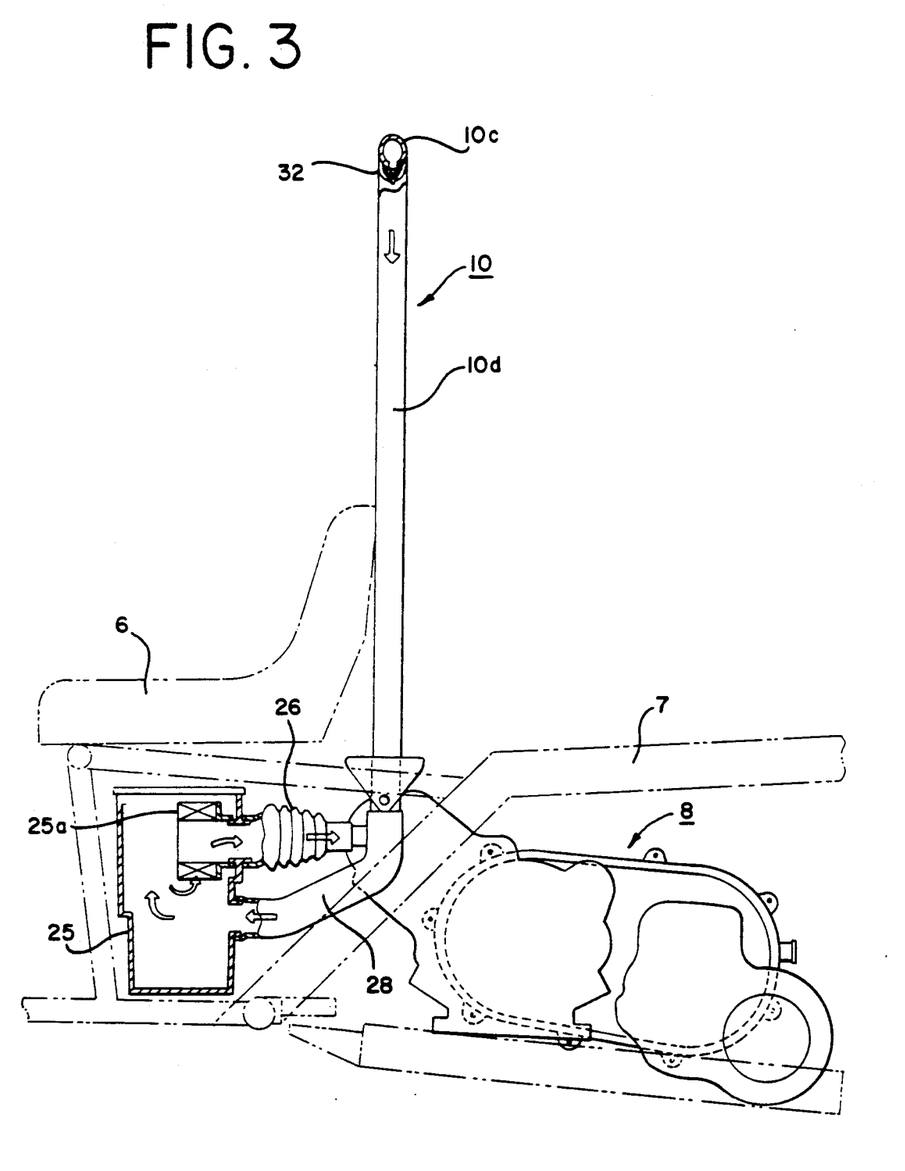
FIGS. 3 and 4 are views from the directions of arrows A and B, respectively, of FIG. 2.
Figure 4:
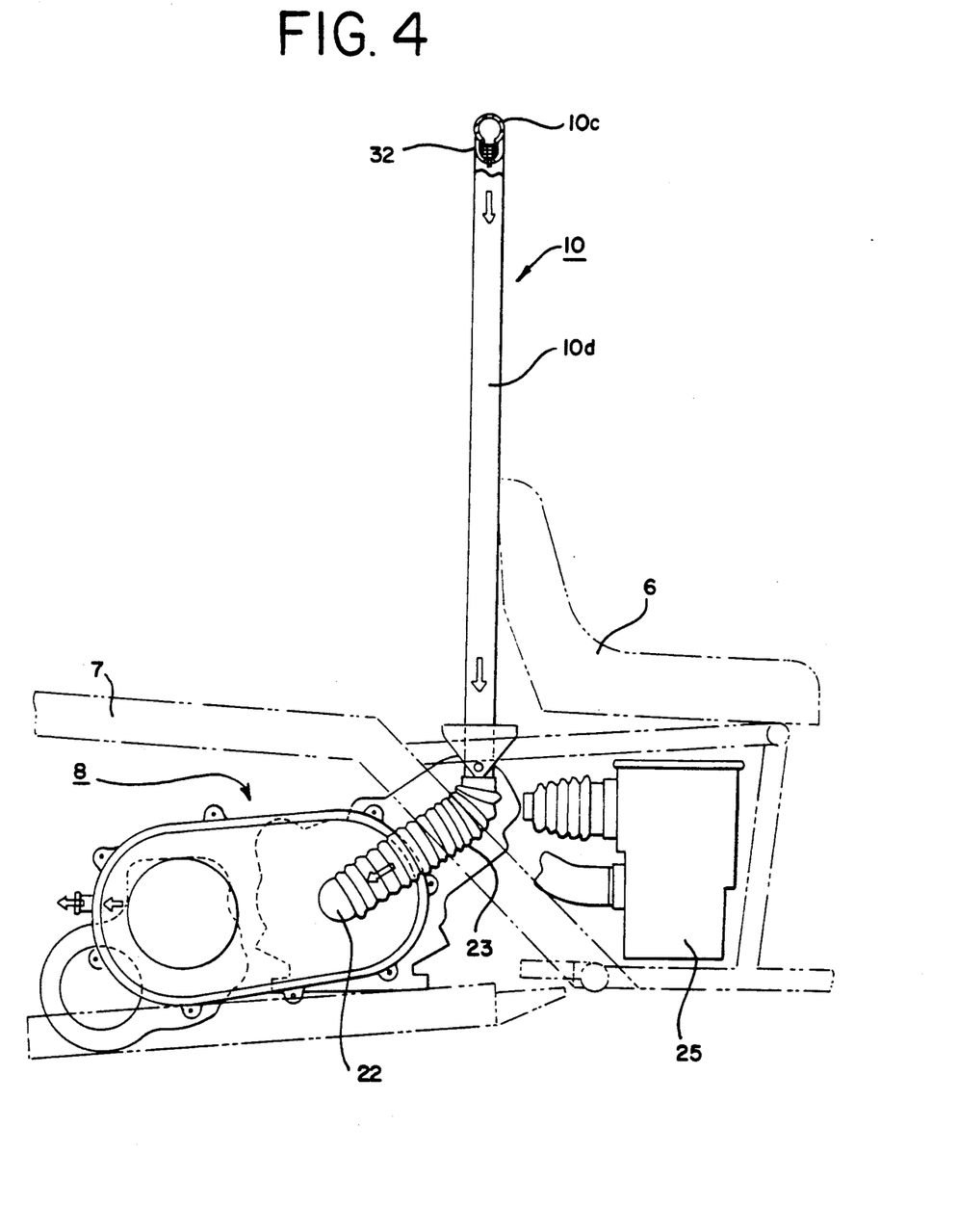

FIG. 2 is a plan view of the engine layout and FIGS. 3 and 4 are views from the directions of arrows A and B, respectively, in FIG. 2.

In these drawings, the transmission case 12 is located to the rear of the engine 8, and the belt converter 13 is located to the right (the top of the drawing in FIG. 2) of the engine 8 and the transmission case 12.

The belt converter 13 includes an endless belt 16 which links a variable pulley mechanism 14 on the input side with a pulley mechanism 15 on the output side, and the speed ratio can be steplessly changed in accordance with the changes of the pulley radii of the pulley mechanisms 14 and 15. The pulley mechanism 14 on the input side is mounted on the end of a crankshaft 18 which protrudes to the right from the crankcase 17. The pulley mechanism 15 on the output side is mounted on the part which protrudes to the right from the transmission case 12.

The outer shell of the belt converter 13 is of sealed construction and it is comprised of a case 19 and a cover 20. The cover 20 encloses the pulley mechanisms 14 and 15 and the endless belt 16 and is secured to the edge of the case 19.

The variable pulley 14a of the pulley mechanism 14 on the input side is positioned to the outside (the top in FIG. 2) of the belt 16, and a cooling fan 21 is mounted at the center of its outer end surface. The cooling fan 21 is constructed so as to revolve in linkage with the engine 8. Also, an air intake port 22 is formed to the outside of this cooling fan 21, that is, in the cover 20 at a position close to the outside of the cooling fan 21. A flexible connection duct 23 is provided so that it covers this air intake port 22 and forms the air intake Ib for the cooling of the belt converter, and, as will be explained later, this is connected to one of the bottom ends of the hollow frame 10. Also, 24 is the exhaust duct for the cooling air.

As for the air intake Ie for the engine 8, it is formed by the connection of the air cleaner 25 to the carburetor 27 via an air intake pipe 26. In addition, as will be explained later, the other bottom end of the hollow frame 10 is connected to the air cleaner 25 via a connection pipe 28.

Figure 5:
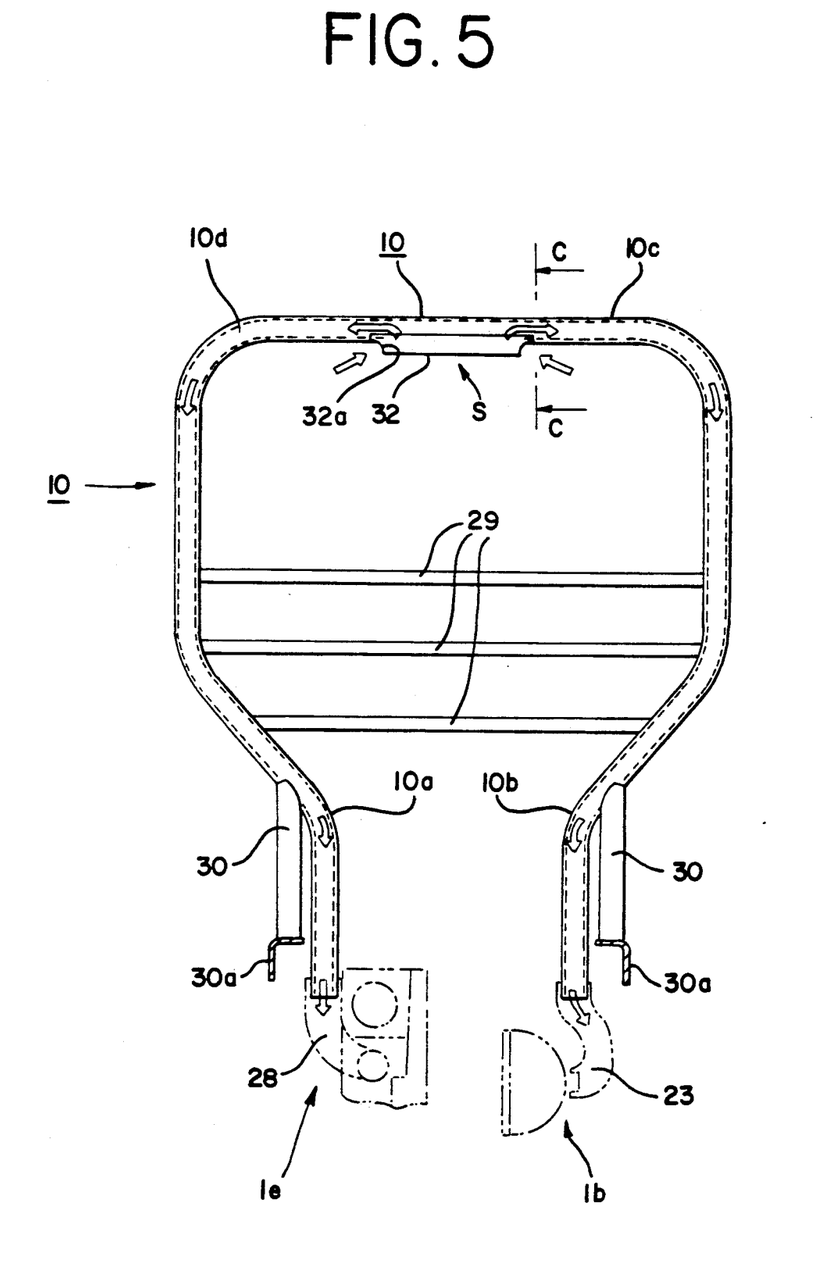
FIG. 5 shows an overall frontal view of the air intake system.

FIG. 5 shows an overall frontal view of the hollow frame 10.

The hollow frame 10 is formed in the shape of an open-ended rectangle, and multiple crosspipes 29 can be provided in the central area as needed for reinforcement or to prevent toppling of the cargo. In addition, attachment frames 30 having at their ends attachment seats 30a for attachment to the cargo bed 7 are mounted in parallel to the two lower ends 10a and 10b of the frame 10. Also, as shown in FIGS. 2 through 4, the air intake Ie of the engine is connected to the open end of one lower end 10a of the hollow frame 10. In other words, the open end of the lower end 10a of the hollow frame 10 is connected to the engine via the connection pipe 28, the air cleaner 25, the air cleaner element 25a, the flexible air intake pipe 26, and the carburetor 27. In addition, the open end of the other lower end 10b of the hollow frame 10 is connected to the air intake port 22 for cooling of the belt converter via the flexible connection duct 23.

Figures 6A, 6B, 6C:
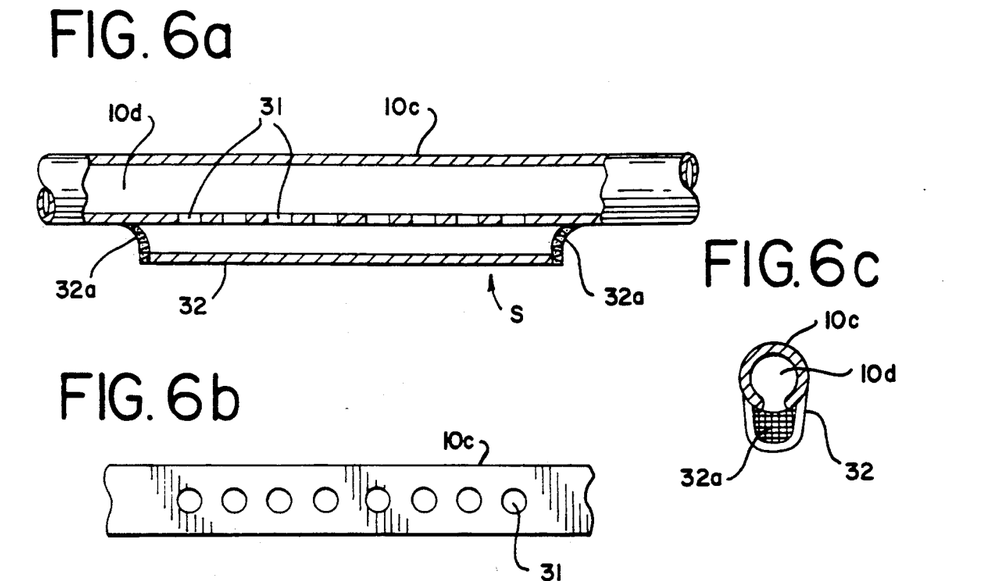
FIG. 6(a) is a cross-sectional view of the air intake.
FIG. 6(b) is a plan view of the intake openings.
FIG. 6(c) is a view along the plane C—C indicated of FIG. 5.

As shown in FIG. 5, an air intake S is formed at approximately the center of the horizontal frame 10c which is the upper member of the hollow frame 10. FIG. 6(a) is a cross-sectional view showing the construction of this air intake S, FIG. 6(b) is a plan view of the intake openings, and FIG. 6(c) is a view along the plane C—C indicated in FIG. 5.

As shown in these drawings, multiple intake openings 31 for taking in air are formed in the lower surface of the horizontal frame 10c, and a half-pipe-shaped cover member 32 is attached from below so as to cover those intake ports 31, thus preventing the entrance of dust and other foreign matter (for example, leaves and grass), rain and water from washing the vehicle. At both ends of this cover member are formed air intake ports 32a.

Figure 7A:
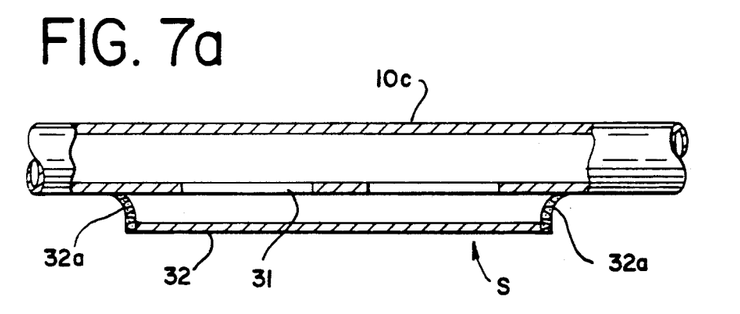
FIGS. 7(a) and 7(b) show a different embodiment of the intake openings of the air intake.
Figure 7B:
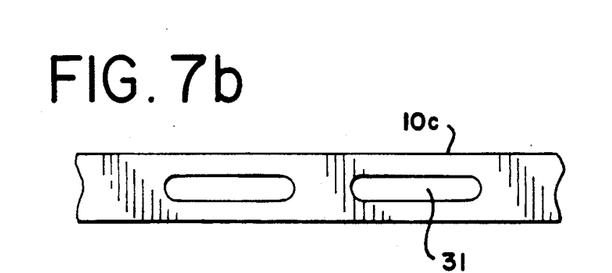

As shown in FIGS. 6(b) and 7(b), the intake openings 31 in the air intake S are either round or oval, and the total area of those openings is approximately twice the cross-sectional area of the hollow (horizontal) frame 10.

In order to reduce the air intake resistance, the cross-sectional area of the air intake ports 32a in the cover member 32 is more than twice the cross-sectional area of the hollow frame 10. In addition, metal screens are provided here (FIG. 6(c)) in order to prevent large pieces of foreign matter from entering. Although the hollow frame 10 shown in FIG. 5 is a one-piece construction, it is possible to split it into two parts at the top.

Figure 8:
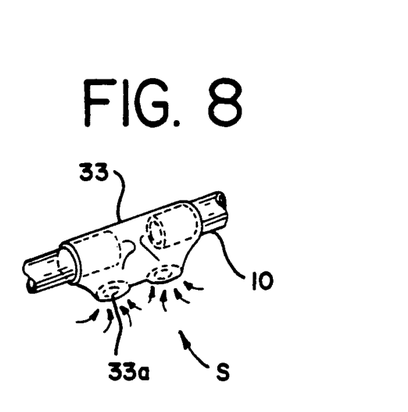
FIG. 8 shows a different embodiment of the air intake.

FIG. 8 shows a different embodiment of the air intake S. The two ends of the hollow frame 10 which is split into two parts at the top center are connected via a connecting piece 33, and at the same time, air intake ports 33a are formed in the front end of the connecting piece 33. Thus, while the connecting piece 33 functions as a connecting member for the split hollow frame 10, at the same time it also forms the air intake S.

With the composition described above, as indicated by the arrows in FIG. 5, the air is taken in through the air intake ports 32a at both ends of the cover member 32, passes through the intake openings 31 in the horizontal frame 10c, and is guided to the two lower ends 10a and 10b of the hollow frame 10 which is formed in the shape of an open-ended rectangle using the insides of the hollow frame 10 a air passages (guidance passages) 10d. Then, the air which is guided to one of the bases of the hollow frame 10 is guided via the connection pipe 28 to the air intake Ie of the engine 8, and the air which is guided to the other base through the inside of the hollow frame 10 is guided via the connection duct 23 to the air intake Ib (the air intake port 22) for cooling the belt converter.

The reason why the air on one side is taken into the air intake Ie of the engine 8 and at the same time the air on the other side is taken into the air intake Ib (the air intake port 22) for cooling the belt converter is so that pulsing of the two air intakes during operation of the engine 8 will interfere with each other and make it possible to control the carburetor setting. Thus, with this invention, by taking in air for the belt converter 13 at the same time as that for the engine 8, interference is producted. In this case, because the amount of air taken in for the engine 8 is in direct proportion to the engine revolution speed and the amount of air taken in for the cooling fan 21 which is linked to the engine 8 is also in direct proportion to the engine speed, by using the hollow frame 10, which functions as the air intake pipe, to interconnect the two air guidance passages, such as is done in this invention, the mutual interference of the pulsing of the two air intakes described above is obtained across the entire range of engine revolution speeds.

In addition, in order to reduce this air intake pulsing, it is also possible to add a surge tank which will moderate pulsing to part of the hollow frame 10. In this invention, the effect of a surge tank is obtained by providing crosspipes 29 as required and using them as part of the intake passages. Furthermore, if necessary, hollow pipes can be used for the attachment frames 30 and they can be interconnected with the hollow frame 10, which would allow the attachment frames 30 to function in the same way as a surge tank. Here, the length and diameter of the crosspipes 29 and the attachment frames 30 are appropriately selected in order to effectively provide the function of a surge tank. Regarding the crosspipes 29, air intake pulsing can also be greatly reduced by changing the number of pipes.

By using the hollow frame 10 having air intake ports positioned high above the ground as described above, there is less dust taken in, even when driving over farmland or open country and clean air is supplied to the air cleaner 25 of the engine 8, thus reducing the frequency at which cleaning of the air cleaner 25 and other maintenance has to be performed (refer to FIG. 2).

If a hard-top cabin is mounted on the vehicle, it is possible to have a composition in which the air is taken in from the insider of the cabin, thus making it possible to obtain clean air with very little dust.

As explained above, with this invention, by vertically installing a hollow frame which functions as the air intake pipe, because it can be used as the air intake pipes and air intake ports both for the engine and for cooling the belt converter, it is possible to simplify the air intake apparatus, and, in addition, because air intake ports are provided at the top of the hollow frame, there is less dust taken in, even when the utility vehicle is driven on farmland or in open country, clogging of the air cleaner is reduced, and it is possible to supply clean air to the engine.

Furthermore, because the air intake for the belt converter is performed at the same time as the air intake for the engine the pulsing of the two air intakes can be caused to interfere with each other, thus ensuring that the appropriate amount of air is supplied to the engine and making it possible to maintain the performance of the engine.

We claim:

1. An air intake system for a utility vehicle including an engine, a driver's seat, at least one wheel, and a belt converter all being mounted on said vehicle, said engine being located near said driver's seat and powering said wheels via said belt converter, said engine having a combustion air intake and said converter having a cooling air intake, said air intake system comprising a hollow open ended and generally rectangular frame disposed vertically behind said seat, said frame having first and second lower ends, said first lower end being connected to said combustion air intake of said engine and said second lower end being connected to said cooling air intake of said belt converter, said frame further being provided with an upper air intake, a first air passage connected between said upper air intake and said first lower end, and a second air passage connected between said upper air intake and said second lower end.

2. An air intake system as set forth in claim 1, wherein said frame further includes first and second air intakes connected respectively to said first and second air passages, said first and second air intakes being connected.

3. An air intake system as set forth in claim 2, wherein said first and second air intakes are connected at said upper air intake.

4. An air intake system as set forth in claim 3, wherein said upper air intake is above said seat and faces downwardly.

5. An air intake system as set forth in claim 1, wherein said engine produces a series of first air pulses in said first air passage and wherein said belt converter produces a series of second air pulses in said second air passage, said first and second passages being connected to produce interference between said first and second series of pulses of said first and second passages.

* * * * *